United States Patent
Liu et al.

(10) Patent No.: US 8,363,255 B2
(45) Date of Patent: Jan. 29, 2013

(54) PRINT CONTROL METHOD AND DEVICE

(75) Inventors: Wei Liu, Weihai (CN); Yipeng Qu, Weihai (CN); Jiabo Xu, Weihai (CN)

(73) Assignee: Shandong New Beiyang Information Technology Co., Ltd., Weihai, Shandong Province (CN)

( * ) Notice: Subject to any disclaimer, the term of this patent is extended or adjusted under 35 U.S.C. 154(b) by 378 days.

(21) Appl. No.: 12/672,057

(22) PCT Filed: Dec. 21, 2007

(86) PCT No.: PCT/CN2007/071293
§ 371 (c)(1),
(2), (4) Date: Feb. 3, 2010

(87) PCT Pub. No.: WO2009/018704
PCT Pub. Date: Feb. 12, 2009

(65) Prior Publication Data
US 2011/0194136 A1    Aug. 11, 2011

(30) Foreign Application Priority Data
Aug. 6, 2007  (CN) .......................... 2007 1 0140151

(51) Int. Cl.
*G06F 15/00* (2006.01)
*B41L 13/00* (2006.01)
(52) U.S. Cl. ..................................... 358/1.15; 101/119
(58) Field of Classification Search ................... 358/1.15
See application file for complete search history.

(56) References Cited

U.S. PATENT DOCUMENTS

| 5,625,757 | A   |   | 4/1997  | Kageyama et al. |            |
|-----------|-----|---|---------|-----------------|------------|
| 2004/0017583 | A1 | * | 1/2004  | Kageyama et al. | 358/1.15 |
| 2005/0024673 | A1 | * | 2/2005  | Sakai           | 358/1.14 |
| 2010/0271663 | A1 | * | 10/2010 | Kadota          | 358/1.15 |

FOREIGN PATENT DOCUMENTS

| CN | 1350226 A    | 5/2002  |
|----|--------------|---------|
| CN | 1439957 A    | 9/2003  |
| CN | 1530821 A    | 9/2004  |
| CN | 1648852 A    | 8/2005  |
| CN | 1661543 A    | 8/2005  |
| JP | 8339274 A    | 12/1996 |
| JP | 2002205428 A | 7/2002  |

OTHER PUBLICATIONS

European Patent Application No. 07846119.1, European Search Report dated Nov. 11, 2008, 7 pages.

* cited by examiner

*Primary Examiner* — Saeid Ebrahimi Dehkordy
(74) *Attorney, Agent, or Firm* — Kilpatrick Townsend & Stockton LLP

(57) ABSTRACT

A print control method and device, wherein the method includes: monitoring a print system port, storing a print task at a preset memory address in the form of job file when the print task exists at the print system port; querying the memory address on schedule, determining the target job file when there is a job file storing at the memory address; querying the printer state, if the printer is idle, sending the target job file; when the printer is in a state of failure, feeding a failure state prompting information back. The solution queries the printer work state before the job file is sent, feeds the prompting information back when the printer occurs failure, detects the print process state of job files, and performs a processing for failure when a print fails. Through the solution, users can know the states of job files in time and missing or omitting of a job file is avoided.

15 Claims, 8 Drawing Sheets

PRINT CONTROL METHOD AND DEVICE

This application claims priority to Chinese Patent Application No. 200710140151.7, filed with the Chinese Patent Office on Aug. 6, 2007 and entitled "Print control method and device", which is hereby incorporated by reference in its entirety.

FIELD OF THE INVENTION

The present invention relates to the field of print control and in particular to a print control method and device.

BACKGROUND OF THE INVENTION

At present, a job file is typically printed in a manner that host software utilizing a printer driver edits with text edit software (e.g., Microsoft Word, Notebook, etc.) and distributes a print task for printing on printer.

However, in the foregoing print manner, the host software can only monitor a status of a job processed by a host without detecting a communication status between the host and the printer or a status of the printer. Consequently, the host software may not know a failure of communication between the host and the printer or a failure of the printer. Especially, when the host software distributes the job file to the printer over a network, the job file would easily be missed or incomplete if the network or the printer is not under supervision. In the catering industry, for example, a menu customized at the foreground for a consumer is transmitted through host software to a printer at a background kitchen for printing, and a cooker prepares a dish according to the printed menu. However, no job file can be printed in case of a data loss resulting from a failure of a communication line between a host and the printer or a failure of the printer (due to a paper jam or ticket paper being exhausted, for example). The host unable to know this condition may deem completion of printing by default, but actually the background cooker has not received the menu distributed from the foreground, thus failing to cater to the consumer duly.

SUMMARY OF THE INVENTION

In view of this, an object of embodiments of the invention is to provide a print control method and device in order to address the problem in the present art of missing a distributed job file because the condition of how the job file has been processed is not known duly.

The invention is implemented as follows.

A print control method includes:

monitoring a port of a print system, and storing a print task to a preset storage address in the form of a job file upon occurrence of the print task at the port of the print system;

performing a periodical query on the storage address, and determining a target job file when one or plural job files are stored at the storage address; and performing a query on a status of a printer, and distributing the target job file when the printer is in an idle status or feeding back error status indication information when the printer is in a failure status.

Preferably, the method further includes:

detecting the status of the printer in a process of printing the target job file, and performing an error process when failing in printing.

Preferably, the method further includes dividing the target job file into pages prior to distribution of the job file.

Preferably, the dividing of the target job file into the pages includes:

retrieving start instruction data, end instruction data, and print data of each page, respectively, of the target job file, and storing them to a preset buffer area.

Preferably, the method further includes:

deleting the target job file from the storage address upon completion of printing the target job file.

Preferably, the storing of the print task to the preset storage address in the form of a job file includes the steps of:

performing a query on whether a job file with the same name as the print task is stored at the preset storage address, and if a job file with the same name as the print task is stored at the preset storage address, modifying the name of the print task and storing the print task to the storage address in the form of a job file; otherwise, storing the print task directly to the storage address in the form of a job file.

Preferably, the storing of the print task to the preset storage address further includes:

adding, in the job file, flag data indicating completion of storage upon completion of storing the job file.

Preferably, the determining of the target job file includes the steps of:

determining the only one existing job file as the target job file; or determining each of plural job files stored at the storage address sequentially as the target job file in a temporal sequence.

Preferably, the determining of the target job file includes the steps of:

determining as the target job file the only one existing job file containing flag data indicating that the job file is complete; or queuing plural job files stored at the storage address in a temporal sequence, determining sequentially whether each of the job files contains flag data indicating that the job file is complete, and if the job file contains flag data indicating that the job file is complete, determining the job file as the target job file; otherwise, modifying an extension of the job file as an extension indicating that the file is incomplete, and determining whether the next job file contains flag data indicating that the job file is complete.

The invention further discloses a print control device including:

a first processing unit adapted to monitor a port of a print system and to store a print task occurring at the port of the print system to a preset storage address in the form of a job file; and a second processing unit adapted to determine a target job file from one or plural job files present at the storage address as a result of a query, to perform a query on a status of a printer, and to transmit the target job file when the printer is in an idle status or feed back error status indication information when the printer is in a failure status.

Preferably, the device further includes a third processing unit adapted to divide into pages the target job file transmitted from the second processing unit to the printer.

Preferably, the device further includes:

a fourth processing unit adapted to detect the status of the printer in a process of printing the target job file and to perform an error process when failing in printing.

Preferably, the device further includes:

a first setting unit adapted to modify the name of the job file when another job file with the same name of the job file is present at the storage address.

Preferably, the device further includes:

a second setting unit adapted to add, in the job file, flag data indicating completion of storage upon completion of storing the job file.

Preferably, the device further includes:

a process determination unit adapted to retrieve a detection result of the third processing unit and to feed back indication information indicating completion of printing upon determining completion of printing the target job file; and a deletion unit adapted to retrieve the indication information and to delete the target job file upon completion of printing the target job file.

As can be seen from the foregoing technical solutions, in contrast with the prior art, the invention performs the query on the status of the printer prior to the distribution of the job file, feeds back the indication information when the printer fails, detects the print process status of the job file, and performs the error process when failing in printing. With the embodiments of the invention, the information can be fed duly back to a user, so that the user can know duly the status of processing the job file, thereby preventing a loss or missing of the job file.

DETAILED DESCRIPTION OF THE INVENTION

An essential idea of the invention is as follows. A print task distributed from a host is stored to a preset storage address in the form of a job file. A periodical query on the preset storage address is performed. A target job file is determined when one or plural job files are stored at the storage address. A query on a status of a printer is performed prior to distribution of the target job file. The status of the printer in the process of printing the target job file is detected. Error indication information is fed back or an error process is performed if a problem occurs.

The invention will be further detailed below with reference to the drawings and the embodiments to make those skilled in the art better understand the solutions of the invention.

Figure 1:
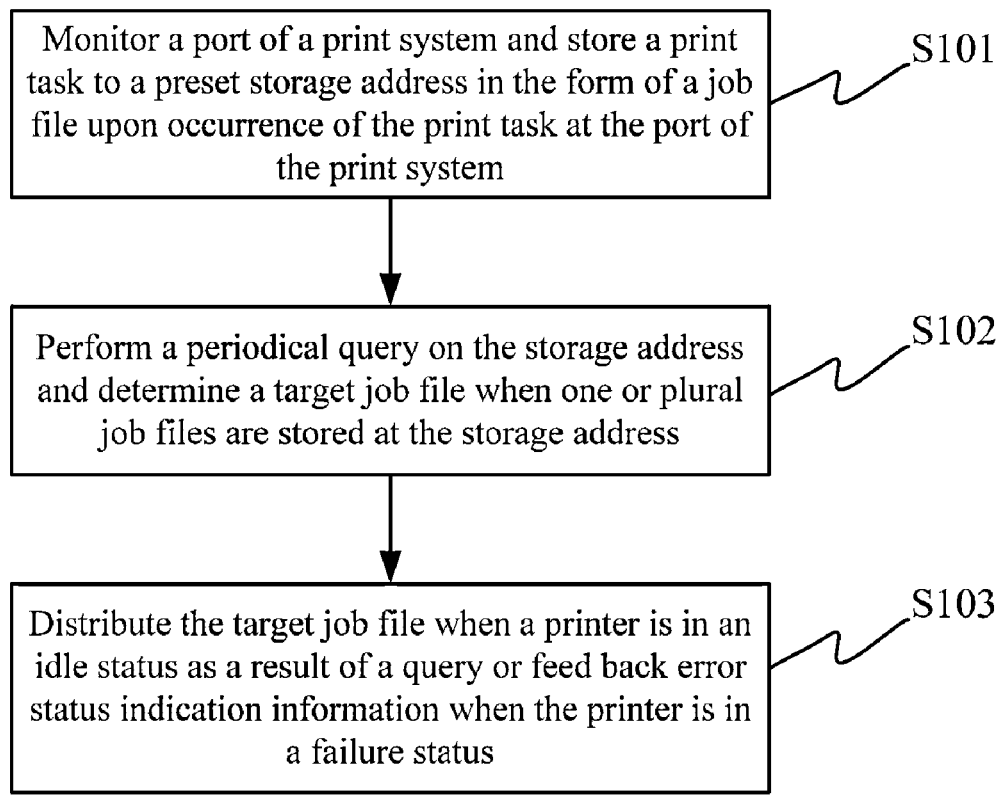
FIG. 1 is a flow chart illustrating a print control method according to a first embodiment of the invention.

Reference is made to FIG. 1, which is a flow chart illustrating a print control method according to a first embodiment of the invention.

The following steps are included.

Step 101: A port of a print system is monitored, and a print task is stored to a preset storage address in the form of a job file upon occurrence of the print task at the port of the print system.

A periodical query on the preset storage address is performed. The storage address is a storage space on a hard disk of a host, which can be represented in the form of a directory, e.g., Host/Printer/Print File, indicating that the storage address is a folder "Print File" in a folder "Printer" on the host.

Step 102: A periodical query on the storage address is performed, and a target job file is determined when one or plural job files are stored at the storage address.

The job file or one of the job files at the storage address is determined as the target job file.

Step S103: The target job file is distributed when a printer is in an idle status as a result of a query; or error status indication information is fed back when the printer is in a failure status.

Periodical detection of the status of the printer is performed (for example, periodical retrieval on status data of the printer is performed, and the status of the printer is determined from the status data). If the printer is in a failure status, error status indication information indicating to a user is fed back to notify immediately the user about the failing printer and prevent a loss of the job file. Thus, the user can repair duly the printer in response to the error status indication information. When the printer is in an idle status, the target job file is distributed to the printer.

In the embodiment of the invention, the query on the status of the printer is performed prior to the distribution of the job file to the printer, and the indication information is fed back when the printer fails. With this embodiment, the user can know duly and hence deal with the status of the printer to thereby prevent a loss or missing of the job file.

It shall be noted that the query on whether one or plural job files are present is performed in the step S102 by determining whether one or plural files with a preset extension (that is, the one or plural job files are one or plural files with the preset extension) are stored at the preset storage address.

When one job file is stored at the preset storage address as a result of the query, the job file is determined directly as the target job file. When plural job files are stored at the preset storage address as a result of the query, the respective job files are compared in terms of their storage time, and a job file with the earliest storage time among the plural job files is determined as the target job file.

It shall further be noted that the foregoing query on the status of the printer can be a periodical query or a query performed after the target job file is determined.

Figure 2:
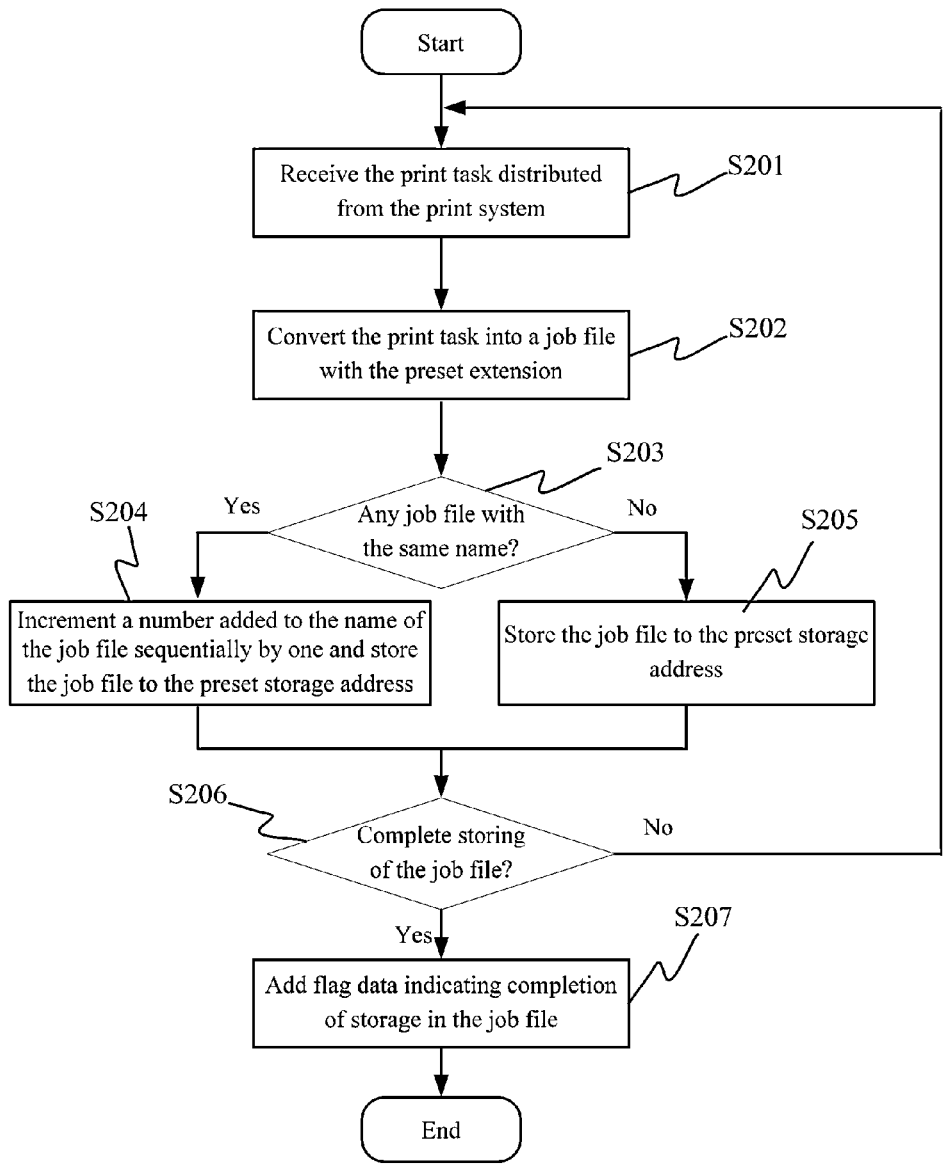
FIG. 2 is a flow chart illustrating storing a print task at a preset storage address in the print control method according to the first embodiment of the invention.

Referring to FIG. 2, storing the job file at the preset storage address in the foregoing embodiment can be performed in the following steps.

Step S201: The print task distributed from the print system is received.

Step S202: The print task is converted into a job file with the preset extension.

Step S203: It is determined whether a job file with the same name as the print task is stored at the preset storage address; if a job file with the same name as the print task is stored at the preset storage address, the flow goes to the step S204; otherwise, the flow goes to the step S205.

Step S204: A number added to the name of the job file is incremented sequentially by one, the job file is stored to the preset storage address, and the flow goes to the step S206.

Step S205: The job file is stored to the preset storage address.

Step S206: It is determined whether storage of the present job file has been completed; if storage of the present job file has been completed, the flow goes to the step S207; otherwise, the flow goes to the step S201.

Step S207: Flag data indicating completion of storage is added in the job file.

Those ordinarily skilled in the art can appreciate that the foregoing flow can be performed by a program instructing relevant hardware, which can be stored in a computer readable storage medium. For example, the foregoing flow can be arranged in the form of a program as a supplement to an existing driver for improvement.

Figure 3:
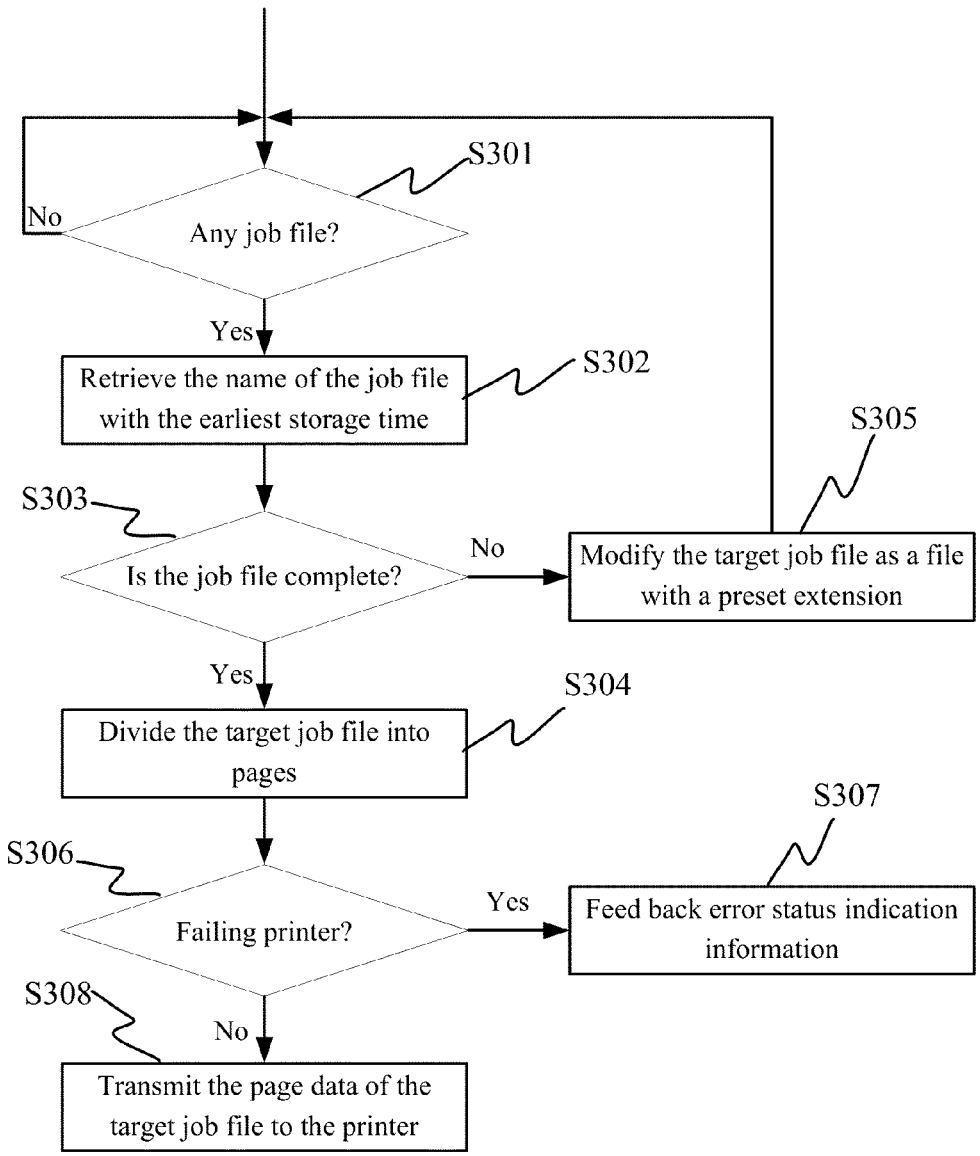
FIG. 3 is a flow chart illustrating a print control method according to a second embodiment of the invention.

FIG. 3 illustrates a flow chart of a print control method according to a second embodiment of the invention.

After the step S101, a process of controlling a job file to be printed particularly includes the following steps.

Step S301: A query on whether one or plural job files are present at the preset storage address is performed; if one or plural job files are present at the preset storage address, the flow goes to the step S302; otherwise, the flow returns to the step S301.

Step S302: The name of a job file with the earliest storage time among the one or plural job files is retrieved.

If there are plural job files, these plural job files are compared in terms of their storage time, and the name of one of the job files with the earliest storage time is retrieved; and if there is only one job file, the name of the job file is retrieved directly.

Step S303: Integrality of the job file is determined. If the job file is complete, the flow goes to the step S304; otherwise, the flow goes to the step S305.

After the name of the job file is retrieved, the job file is opened to read data. If the job file contains a preset end flag, the job file is determined to be complete and thus as a target job file; otherwise, the job file is determined to be incomplete.

Step S304: The target job file is divided into pages, and the flow goes to the step S306.

Start instruction data, end instruction data, and print data of each page of the target job file are retrieved, respectively, and each page is buffered sequentially in a preset buffer area.

Step S305: The target job file is modified as a file with a preset extension, and the flow goes to the step S301.

Step S306: A periodical query on a status of the printer is performed. If the printer is in a failure status, the flow goes to the step S307; otherwise, the flow goes to the step S308.

Step S307: Error status indication information is fed back.

The error status indication information indicates a failure of the printer, e.g., Top Cover open, No paper, etc.

Step S308: The page data of the target job file in the buffer area is transmitted to the printer.

In the embodiment of the invention, integrality of the job file is determined prior to the distribution of the job file to the printer. When the job file is incomplete, it will not be printed, and the next job file will be performed. Moreover, the status of the printer is detected to thereby prevent uncompleted printing of the job file on one hand and prevent an incomplete job file from causing abnormal printing of a subsequent job file on the other hand.

Figure 4:
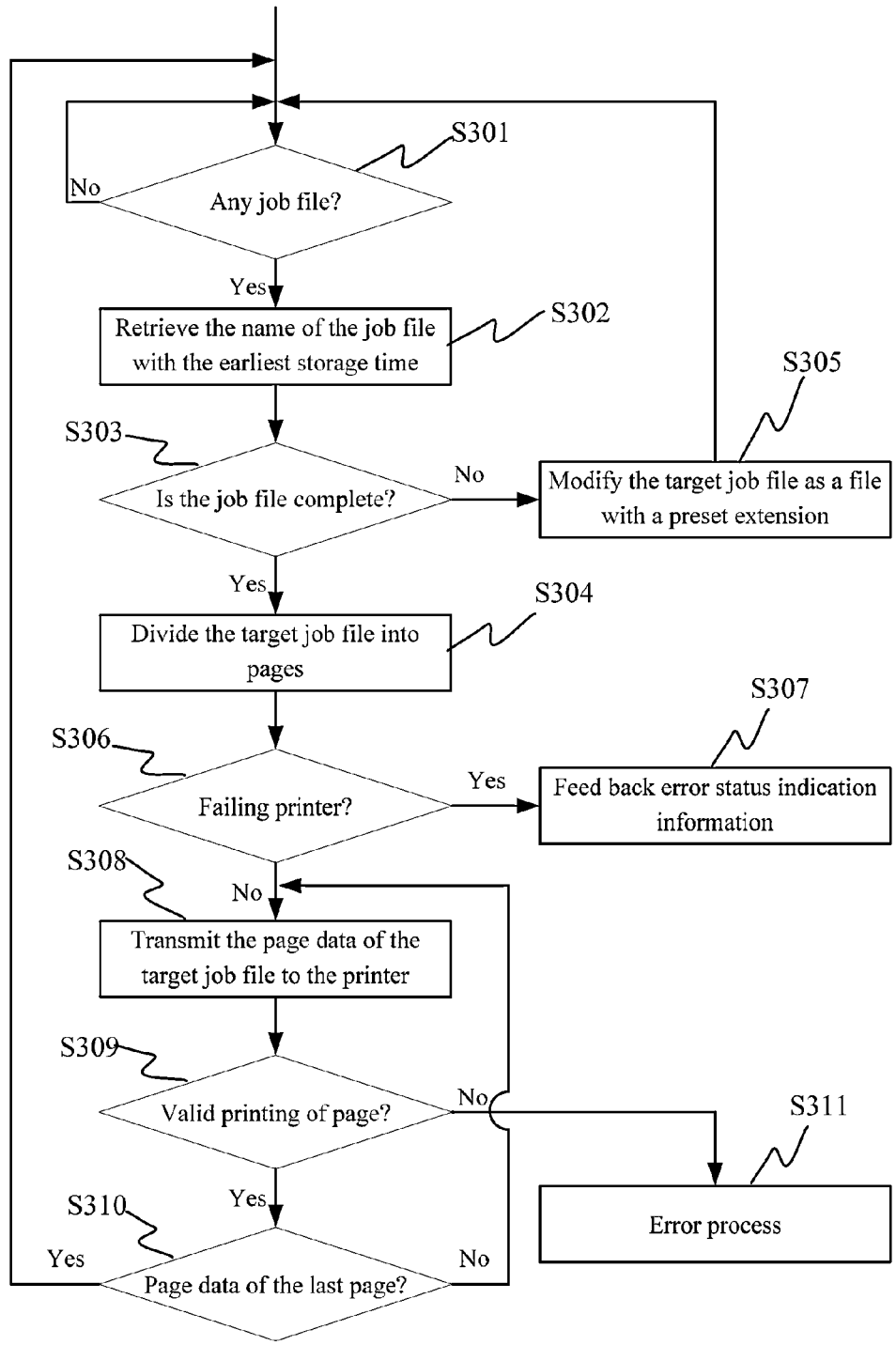
FIG. 4 is a flow chart illustrating a print control method according to a third embodiment of the invention.

FIG. 4 illustrates a flow chart of a third embodiment according to the invention.

The present embodiment improves the foregoing second embodiment with addition of the following steps thereto after the step S308, in order to prevent uncompleted printing of a page due to a failure of the printer in the process of printing the job file.

Step S309: The status of a print process is detected. It is determined whether printing of a page is valid; and if printing of a page is valid, the flow goes to the step S310; otherwise, the flow goes to the S311.

Determination of whether printing of a page is valid is determination of whether the page has been printed completely. After the job file is distributed from the host, the status of the print process is detected. A normal process of printing completely a page means that the status of the printer changes from an idle status to an ongoing print status to a normal print end status, and a process of printing incompletely a page means that the status changes from an idle status to a printer error status or from an idle status to an ongoing print status to an unfinished print status. Therefore, whether the page has been printed completely (that is, whether printing of the page is valid) can be determined from the status of the printer in the print process.

Step S310: It is determined whether the page data is page data of the last page; and if the page data is page data of the last page, the flow goes to the step S301; otherwise, the flow goes to the step S308.

Step S311: An error process is performed.

A corresponding process is performed as preconfigured to, for example, continue with printing, reprint or delete the present job file. Particularly, continuing with printing refers to continuing with printing the next page without processing the present page data, reprinting refers to retransmitting of the page data to the printer, and deleting the present job file refers to deleting the present job file in order to continue with processing the next job file.

Reprinting can alternatively refer to transmitting the print data of the page to another printer for printing as well as adding reprint information indication to the beginning of the page data. The other printer is generally a backup printer.

In the embodiment of the invention, both the status of the printer and the status of the print process are detected after the distribution of the job file to the printer. The error status indication information is fed back or the error process is performed when the printer fails or printing of any page is invalid, thereby preventing a missing or loss of the job file due to the failure of the printer in the print process.

Figure 5:
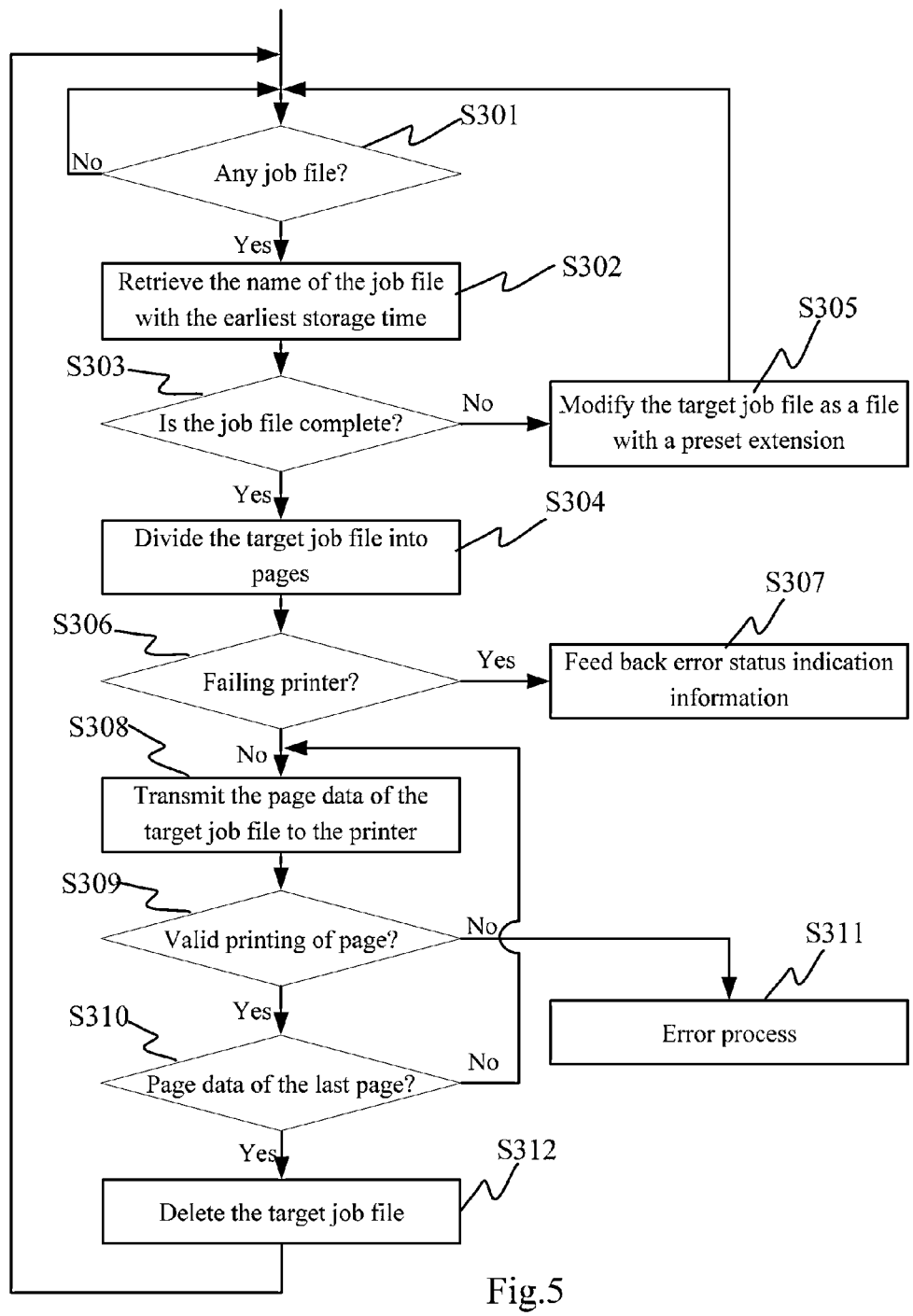
FIG. 5 is a flow chart illustrating a print control method according to a fourth embodiment of the invention.

Reference is made to FIG. 5, which is a flow chart illustrating a print control method according to a fourth embodiment of the invention.

The flow can further go to the step S312 when the page data is page data of the last page based upon the foregoing embodiment in order to prevent abnormal repeated printing.

Step S312: The target job file is deleted, and the flow goes to the step S301.

Those ordinarily skilled in the art can appreciate that all or a part of the steps in the method according to the foregoing embodiments can be performed by a program instructing relevant hardware, which can be stored in a computer readable storage medium. For example, the method flows of the foregoing embodiments can be a background control program which controls the job file to be printed after the job file is distributed from the host.

Figure 6:
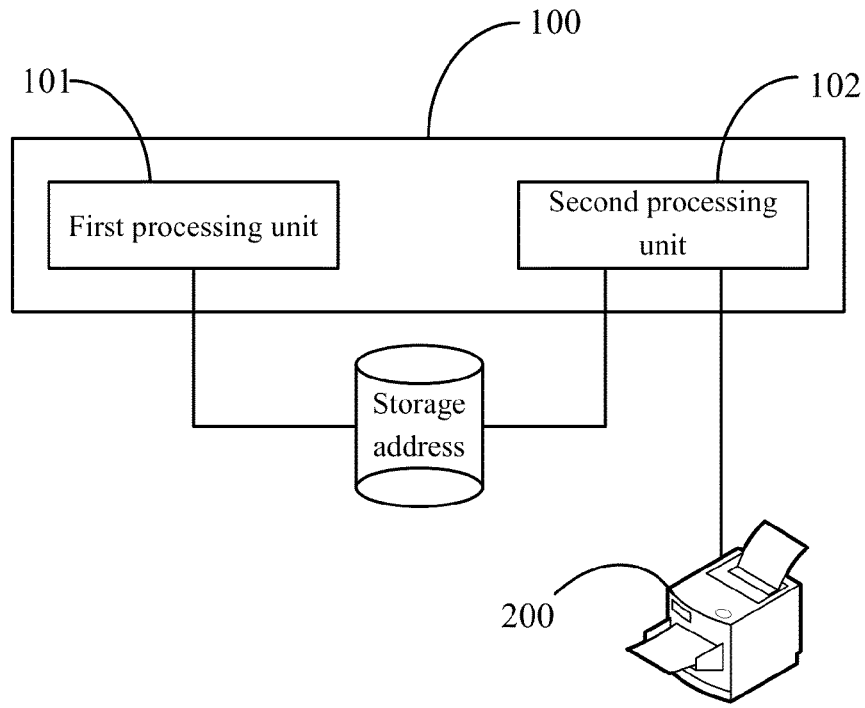
FIG. 6 is a structural schematic diagram illustrating a print control device according to a first embodiment of the invention.

Corresponding to the print control method disclosed as above, the invention further discloses a print control device. Reference is made to FIG. 6, which is a structural schematic diagram illustrating a print control device according to a first embodiment of the invention.

The print control device includes a first processing unit 101 and a second processing unit 102.

An operation principle and an operation process of the print control device are as follows.

The first processing unit 101 is adapted to monitor a port of a print system, to perform a periodical query on whether a print task occurs at the port of the print system, and to store a print task occurring at the port of the print system to a preset storage address in the form of a job file.

The second processing unit 102 is adapted to perform a periodical query on whether one or plural job files are present at the storage address, to determine as a target job file a job file which is the only one present at the storage address or one of the plural job files present at the storage address as a result of the query; and to perform a query on the status of a printer 200, and to transmit the target job file when the printer 200 is in an idle status or feed back error status indication information when the printer 200 is in a failure status (e.g., Top Cover open, No paper, etc., of the printer).

The second processing unit 102 performs the query on whether one or plural job files are present at the storage address by determining whether one or plural files with a preset extension (that is, the one or plural job files are one or plural files with the preset extension) are stored at the preset storage address.

The query on the status of the printer performed by the second processing unit 102 can be a periodical query or a query performed after the target job file is determined.

When plural job files are stored at the preset storage address, the second processing unit 102 retrieves attributes of the respective job files, compares them in terms of their storage time and determines one of the job files with earliest storage time as the target job file.

It shall be noted that the target job file is a complete job file, that is, the target job file contains a preset end flag indicating that the file is complete.

In the embodiment of the invention, the second processing unit 102 performs the query on the status of the printer 200 and feeds back the indication information when the printer 200 fails. With this embodiment, a user can know duly and hence deal with the status of the printer 200, thereby preventing a loss or missing of the job file.

Figure 7:
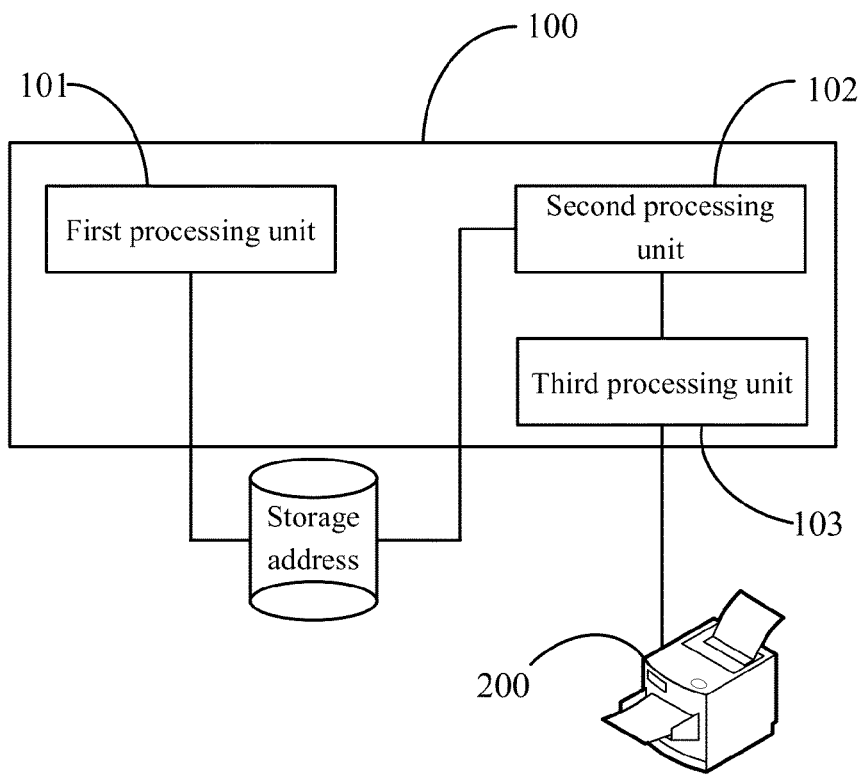
FIG. 7 is a structural schematic diagram illustrating a print control device according to a second embodiment of the invention.

FIG. 7 illustrates a structural schematic diagram of a print control device according to a second embodiment of the invention.

Based upon the foregoing embodiment, the invention can further includes a third processing unit 103 adapted to divide the target job file transmitted from the second processing unit 102 into pages by retrieving start instruction data, end instruction data, and print data of each page, respectively, of the target job file, to buffer each page sequentially in a preset buffer area, and to transmit each page sequentially to the printer.

Figure 8:
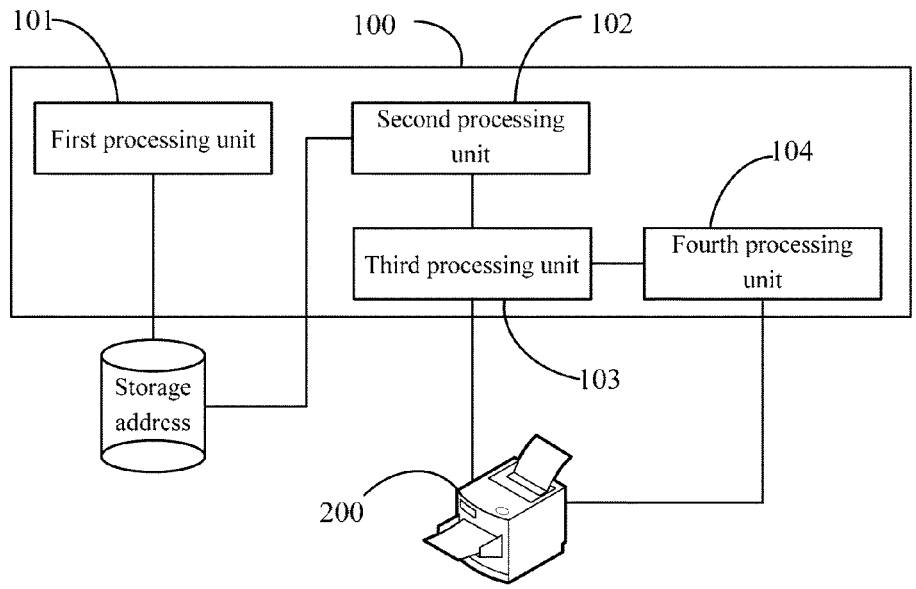
FIG. 8 is a structural schematic diagram illustrating a print control device according to a third embodiment of the invention.

FIG. 8 illustrates a structural schematic diagram of a print control device according to a third embodiment of the invention.

In order to prevent uncompleted printing of page due to a failure of the printer in the process of printing the job file, the invention further includes a fourth processing unit 104 based upon the foregoing embodiment, which is adapted to detect the status of the printer in the process of printing the target job file and to perform an error process when failing in printing.

Determination by the fourth processing unit 104 of the status of the printer in the process of printing the target job file is determination of whether the page has been printed completely, that is, whether printing of the page is valid (periodical detection of the status of the print process). A normal process of printing completely a page means that the status of the printer changes from an idle status to an ongoing print status to a normal print end status, and a process of printing incompletely a page means that the status changes from an idle status to a printer error status or from an idle status to an ongoing print status to an unfinished print status. Therefore, whether the page has been printed completely (that is, whether printing of the page is valid) can be determined by the status of the printer in the print process.

The error process refers to a corresponding process performed as preconfigured to, for example, continue with printing, reprint or delete the present job file. Particularly, continuing with printing refers to continuing with printing the next page without processing the present page data, reprinting refers to retransmitting a print request to the third processing unit 103 which in turn retransmits the page data to the printer, and deleting the present job file refers to deleting the present job file in order to continue with processing the next job file.

Reprinting can alternatively refer to transmitting the print data of the page to another printer for printing as well as adding reprint information indication to the beginning of the page data, or refer to transmitting a retransmission request for the third processing unit 103 to transmit the present page data to another printer for printing as well as adding reprint information indication to the beginning of the page data. The other printer is generally a backup printer.

Figure 9:
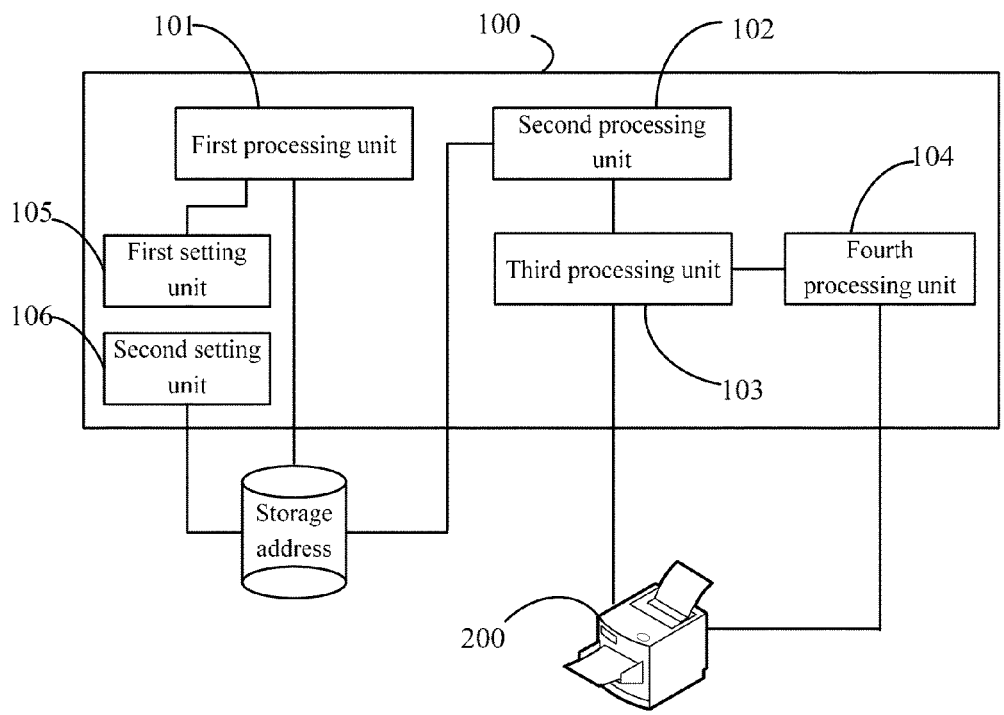
FIG. 9 is a structural schematic diagram illustrating a print control device according to a fourth embodiment of the invention.

FIG. 9 illustrates a structural schematic diagram of a print control device according to a fourth embodiment of the invention.

The invention further includes a first setting unit 105 and a second setting unit 106 based upon the foregoing embodiment.

The first setting unit 105 is adapted to modify the name of the job file (for example, increment a number added to the name of the job file by one sequentially) when the first processing unit 101 determines that another file with the same name of the job file is present at the preset storage address.

The second setting unit 106 is adapted to add, in the job file, flag data indicating completion of storage to indicate that the file is a complete job file upon completion of storing the file.

The first setting unit 105 can be arranged in the first processing unit 101.

Figure 10:
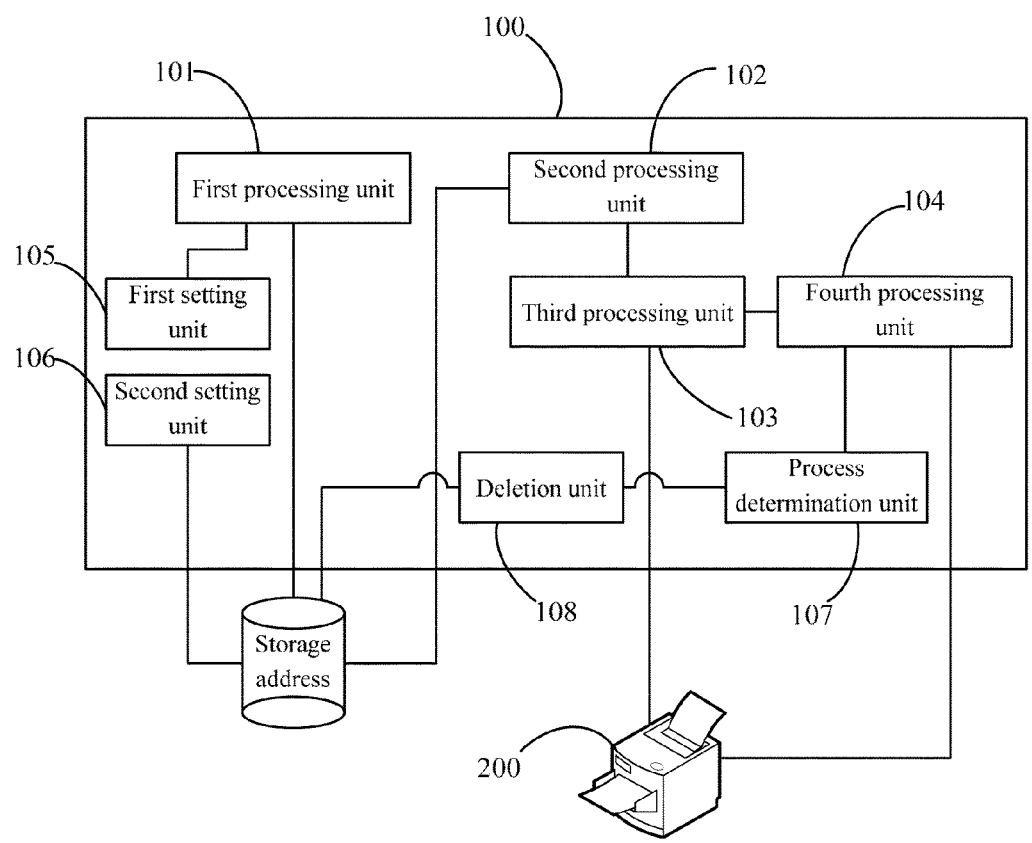
FIG. 10 is a structural schematic diagram illustrating a print control device according to a fifth embodiment of the invention.

FIG. 10 illustrates a structural schematic diagram of a print control device according to a fifth embodiment of the invention.

The invention can further include a process determination unit 107 and a deletion unit 108 based upon the foregoing embodiment.

The process determination unit 107 is adapted to perform periodical retrieval on a detection result of the fourth processing unit 104, to determine whether printing of the target job file has been completed from whether the present page contains flag data indicating that the job is complete, and to feed back indication information indicating completion of printing upon determining completion of printing the target job file.

The deletion unit 108 is adapted to retrieve the indication information and to delete the target job file from the storage address to thereby avoid abnormal repeated printing.

It shall be noted that the print control device according to the invention can be arranged in a computer and the storage address can be a storage space in a hard disk of the computer.

The foregoing disclosure is merely illustrative of the preferred embodiments of the invention, but the invention will not be limited thereto, and any variations without any inventive effort that can occur to those skilled in the art and modifications and adaptations that can be made by those skilled in the art without departing from the principle of the invention shall fall into the scope of the invention.

The invention claimed is:

1. A print control method, comprising:
    monitoring a port of a print system, and storing a print task to a preset storage address in the form of a job file upon occurrence of the print task at the port of the print system;
    performing a periodical query on the storage address, and determining a target job file when one or plural job files are stored at the storage address; and
    performing a query on a status of a printer, and distributing the target job file when the printer is in an idle status or feeding back error status indication information when the printer is in a failure status.

2. The method according to claim 1, further comprising:
    detecting the status of the printer in a process of printing the target job file, and performing an error process when failing in printing.

3. The method according to claim 1, further comprising dividing the target job file into pages prior to the distribution of the target job file.

4. The method according to claim 3, wherein the dividing of the target job file into the pages comprises:
    retrieving start instruction data, end instruction data, and print data of each page, respectively, of the target job file, and storing them to a preset buffer area.

5. The method according to claim 3, further comprising:
    deleting the target job file from the storage address upon completion of printing the target job file.

6. The method according to claim 5, wherein the storing of the print task to the preset storage address in the form of a job file comprises the steps of:
    performing a query on whether a job file with the same name as the print task is stored at the preset storage address, and if a job file with the same name as the print task is stored at the preset storage address, modifying the name of the print task and storing the print task to the storage address in the form of a job file; otherwise, storing the print task directly to the storage address in the form of a job file.

7. The method according to claim 6, wherein the storing of the print task to the preset storage address further comprises:
    adding, in the job file, flag data indicating completion of storage upon completion of storing the file.

8. The method according to claim 7, wherein the determining of the target job file comprises the steps of:
    determining the only one existing job file as the target job file; or
    determining each of plural job files stored at the storage address sequentially as the target job file in a temporal sequence.

9. The method according to claim 7, wherein the determining of the target job file comprises the steps of:
    determining as the target job file the only one existing job file containing flag data indicating that the file is complete; or
    queuing plural job files stored at the storage address in a temporal sequence, determining sequentially whether each of the plural job files contains flag data indicating that the file is complete, and if the job file contains flag data indicating that the file is complete, determining the job file as the target job file; otherwise, modifying an extension of the job file as an extension indicating that the file is incomplete, and determining whether the next job file contains a flag indicating that the file is complete.

10. A print control device, comprising:
    a first processing unit adapted to monitor a port of a print system and to store a print task occurring at the port of the print system to a preset storage address in the form of a job file; and
    a second processing unit adapted to determine a target job file from one or plural job files present at the storage address as a result of a query, to perform a query on a status of a printer, and to transmit the target job file when the printer is in an idl status or feed back error status indication information when the printer is in a failure status.

11. The device according to claim 10, further comprising:
    a third processing unit adapted to divide into pages the target job file transmitted from the second processing unit to the printer.

12. The device according to claim 10, further comprising:
    a fourth processing unit adapted to detect the status of the printer in a process of printing the target job file and to perform an error process when failing in printing.

13. The device according to claim 10, further comprising:
    a first setting unit adapted to modify the name of the job file when another job file with the same name of the job file is preset at the storage address.

14. The device according to claim 13, further comprising:
    a second setting unit adapted to add, in the job file, flag data indicating completion of storage upon completion of storing the job file.

15. The device according to claim 14, further comprising:
    a process determination unit adapted to retrieve a detection result of the third processing unit and to feed back indication information indicating completion of printing upon determining completion of printing the target job file; and
    a deletion unit adapted to retrieve the indication information and to delete the target job file upon completion of printing the target job file.

* * * * *